United States Patent
Grundfast et al.

(10) Patent No.: US 9,524,513 B2
(45) Date of Patent: *Dec. 20, 2016

(54) SYSTEM AND METHOD OF ADVERTISING FOR USE ON INTERNET AND/OR DIGITAL NETWORKING CAPABLE DEVICES

(71) Applicant: Obelus Media Inc., Newton, MA (US)

(72) Inventors: David Grundfast, Phoenix, AZ (US); Jesse Lopez, Newton, MA (US); Raymond Giles, Brighton, MA (US)

(73) Assignee: OBELUS MEDIA INC., Newton, MA (US)

( * ) Notice: Subject to any disclaimer, the term of this patent is extended or adjusted under 35 U.S.C. 154(b) by 62 days.

This patent is subject to a terminal disclaimer.

(21) Appl. No.: 14/059,313

(22) Filed: Oct. 21, 2013

(65) Prior Publication Data

US 2014/0081765 A1   Mar. 20, 2014

Related U.S. Application Data

(63) Continuation-in-part of application No. 12/828,830, filed on Jul. 1, 2010, now Pat. No. 8,566,817.

(60) Provisional application No. 61/309,690, filed on Mar. 2, 2010.

(51) Int. Cl.
*G06F 9/44* (2006.01)
*G06Q 30/02* (2012.01)

(52) U.S. Cl.
CPC ...... *G06Q 30/0262* (2013.01); *G06Q 30/0267* (2013.01)

(58) Field of Classification Search
CPC ............ G06Q 30/0241; G06Q 2220/00; G06Q 2230/00; G06Q 30/0267; G06Q 30/0277; G06Q 30/0262; G06F 7/00; G06F 17/30749

See application file for complete search history.

(56) References Cited

U.S. PATENT DOCUMENTS

| | | | |
|---|---|---|---|
| 5,737,619 A * | 4/1998 | Judson | 715/236 |
| 5,781,894 A | 7/1998 | Petrecca et al. | |
| 6,011,537 A | 1/2000 | Slotznick | |
| 7,886,067 B2 | 2/2011 | Krassner et al. | |
| 8,566,817 B2 | 10/2013 | Grundfast et al. | |
| 2002/0092019 A1 | 7/2002 | Marcus | |
| 2003/0028565 A1* | 2/2003 | Landsman et al. | 707/513 |
| 2004/0132530 A1 | 7/2004 | Rutanen et al. | |
| 2005/0014494 A1 | 1/2005 | Owen et al. | |
| 2005/0038900 A1* | 2/2005 | Krassner et al. | 709/231 |
| 2006/0100928 A1* | 5/2006 | Walczak et al. | 705/14 |
| 2006/0242017 A1* | 10/2006 | Libes et al. | 705/14 |
| 2006/0282316 A1 | 12/2006 | Snyder et al. | |
| 2007/0088801 A1 | 4/2007 | Levkovitz et al. | |
| 2007/0088852 A1 | 4/2007 | Levkovitz | |
| 2007/0168354 A1* | 7/2007 | Ramer | G06F 17/30749 |
| 2008/0059571 A1 | 3/2008 | Khoo | |
| 2008/0214150 A1 | 9/2008 | Ramer et al. | |
| 2008/0263673 A1 | 10/2008 | Brun et al. | |
| 2008/0276269 A1* | 11/2008 | Miller et al. | 725/34 |

(Continued)

*Primary Examiner* — Tuan Vu

(74) *Attorney, Agent, or Firm* — Snell & Wilmer L.L.P.

(57) ABSTRACT

A system and method of advertising for use on an internet and/or digital networking capable device, wherein the system allows advertisers to use a loading space generated during the initiation of a process on the device to post any media and/or advertising content during the time between when a program or web page is requested and when it actually loads.

19 Claims, 8 Drawing Sheets

(56) References Cited

U.S. PATENT DOCUMENTS

| | | |
|---|---|---|
| 2009/0210899 A1 | 8/2009 | Lawrence-Apfelbaum et al. |
| 2009/0281889 A1* | 11/2009 | Derosa-Grund ........... 705/14.25 |
| 2010/0036740 A1 | 2/2010 | Barashi |
| 2010/0058220 A1* | 3/2010 | Carpenter .................... 715/772 |
| 2010/0082397 A1 | 4/2010 | Blegen |
| 2011/0082743 A1 | 4/2011 | Rutman |
| 2011/0161790 A1* | 6/2011 | Junior et al. ................. 715/205 |

* cited by examiner

SYSTEM AND METHOD OF ADVERTISING FOR USE ON INTERNET AND/OR DIGITAL NETWORKING CAPABLE DEVICES

PRIORITY AND CROSS REFERENCE TO RELATED APPLICATIONS

This Application is a Continuation-In-Part Application of and claims priority to U.S. patent application Ser. No. 12/828,830, filed Jul. 1, 2010, and now issued as U.S. Pat. No. 8,566,817, which claims priority to and the benefit of U.S. Provisional Patent Application No. 61/309,690, filed Mar. 2, 2010, each of which is incorporated herein by reference in their entirety.

FIELD OF THE INVENTION

This invention relates generally to methods of advertising, and more particularly to a system and method of advertising preferably for use with internet and/or digital networking capable devices ("IDNCD").

BACKGROUND OF THE INVENTION

It has been estimated that six out of every ten people worldwide have access to high speed internet with over four billion internet and/or digital networking capable devices in existence. Furthermore, over half a billion people worldwide have been able to access the internet through a mobile web device as of the year 2009 and that number continues to grow. However, even with the increase in users of both internet capable devices and those who have been able to access the internet through such a device, the current methods of sharing digital information simply have not been able to keep up with the times. Presently, both the manner and mode of advertising and delivering information to INDCD's has remained unchanged, and been provided to individual user's of these devices in the same format that has been in use for many years on websites and other digital media.

Initially, screens on smaller web capable devices pose a problem when trying to share media content or advertising. In the often strained relationship between media content sharing and internet and/or digital networking capable devices, advertising must be agreeable to the user. When using an internet and/or digital networking capable device that has limited visual space, the less intrusive the advertising is to the user, the better the user's experience. Internet and/or digital networking capable device users are usually working on essential tasks or using a specific program to accomplish a task, and therefore, intruding with an advertisement during this time can be annoying and potentially aggravating to a user.

Currently, internet and/or digital networking capable devices are untapped resources for advertising. For example, in India, mobile devices accounted for nearly ninety percent of all internet users in 2008. As such, brands are able to pinpoint and profile users much more efficiently on an internet and/or digital networking capable device. Additionally, advertising on an internet and/or digital networking capable device provides advertisers a much more intimate exposure to users.

There are multiple reasons why mobile web advertising is increasing in popularity with large companies including that, mobile phones are highly personal and are always with the user, along with the most direct way an advertiser can connect with the public is through their mobile phone.

The lack of competition on a mobile web page is one of the best aspects of mobile advertisement, since due to the small space a displayed advertisement will not have to share the page with other advertisers. While banner ads and pop-ups saturate websites, through a mobile interface, these advertisements may be displayed in a more user friendly and personal manner that is easy to read.

Therefore, this small space for advertising gives a unique opportunity to advertisers, but is currently thought of as a detriment to this medium. There needs to be a unobtrusive way to use this mobile space to connect users and brands.

SUMMARY OF THE INVENTION

The present invention allows for advertising to be displayed on internet and/or digital networking capable devices in a novel and unique manner. Advertisers will be able to display content and/or media on the screen of the device during the time between when a program or web page is requested and when it actually loads. In one embodiment, the system employs a plurality of internet connections, as well as servers, databases and other mediums employed by networks. The media content may be downloaded and/or cached on a device prior to display or it may be accessed in real time depending on the device and/or individual preferences of a user. The content or media will be triggered to display when a process occurs on the device which necessitates a pause while content or media is loaded or retrieved.

Currently, this space is underutilized and is often populated by a simple phrase such as "loading . . . "; the instant system is disposed to utilize this space. The method of the present invention is meant not to interfere with the process necessitating the loading or retrieving, but may continue after the process has finished if the programmer so wishes. The content or media that was originally requested, which necessitated the loading or retrieval process, is then delivered after the advertising ceases to display.

The primary innovation of the present invention is the use of the underutilized "loading space". Advertisers will be able to seamlessly integrate media into processes that are already necessary and occurring on internet and/or digital networking capable devices. The instant system and method creates a highly visible media space that will be more agreeable to the users of these devices than current methods.

Instead of advertising above, below, to the sides, in the middle, on top, or using any of the current banner and pop-up methods, the present invention alters the delivery method. The present invention puts the advertising between the content and/or media during necessary functional delays such as loading new pages. The present invention is a response to the need for a more visible and at the same time less intrusive form of advertising on and/or digital networking capable devices.

There has thus been outlined, rather broadly, the more important features of the system and method of advertising for internet and network capable devices in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

DETAILED DESCRIPTION OF THE PREFERRED EMBODIMENTS

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention.

The acts, modules, logic and method steps discussed herein below, according to certain embodiments of the present invention, may take the form of a computer program or software code stored on a tangible or non-transitive machine-readable medium (or memory) in communication with a control device, comprising a processor and memory, which executes the code to perform the described behavior, function, features and methods. It will be recognized by one skilled in the art that these operations, structural devices, acts, logic, method steps and modules may be implemented in software, in firmware, in special purpose digital logic, and any combination thereof without deviating from the spirit and scope of the present invention as recited within the claims attached hereto. The software or method steps can be performed on, and certain steps or processes displayed on, mobile devices (e.g., smartphones, tablets, etc.), desktop computers, laptops, etc., or a combination thereof, as understood by those of ordinary skill in the art.

Figure 1:
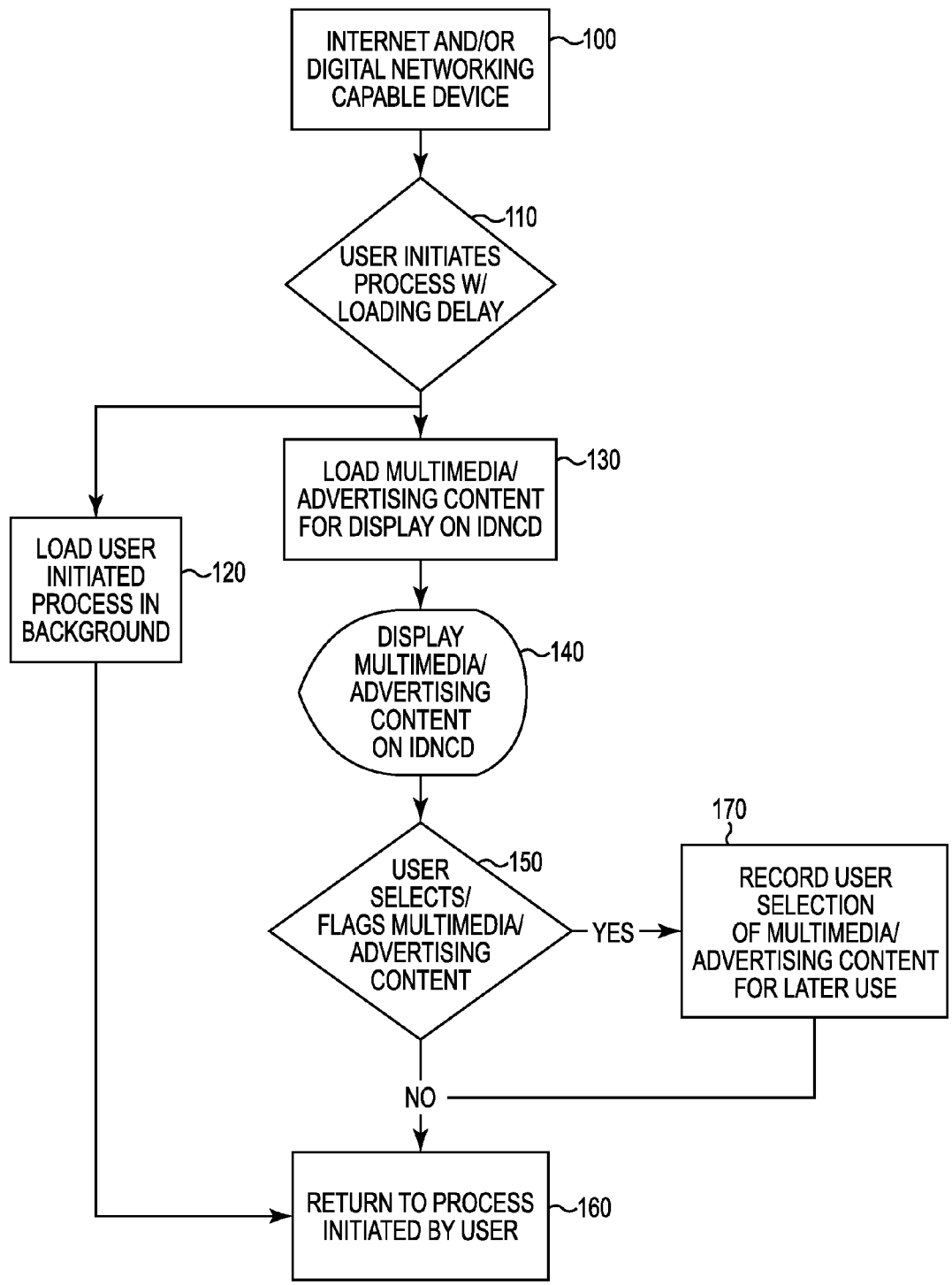
FIG. 1 is a block diagram illustrating a method for receiving multimedia/advertisement on an internet and/or digital wherein by selected/flagged displayed multimedia/advertisement is recorded.

FIG. 1 illustrates a block diagram of a preferred embodiment of the instant invention 10 for a system and method of advertising for use on internet and/or digital networking capable devices. In this embodiment, a method for receiving multimedia/advertisement on an internet and/or digital networking capable device ("IDNCD") is shown, wherein a selection and/or flagging of displayed multimedia and/or advertisement by either the system or an individual user is recorded. At step 100 an individual user of the system initiates the process by interacting with an IDNCD. At step 110, the user initiates a process on the IDNCD, wherein the process includes a loading or scheduled time delay; in one embodiment, the process may include starting a software application on the IDNCD. At step 120, a background or similar appearance is displayed on a screen of the IDNCD during the loading and/or scheduled delay upon initiation of the process in step 110. At step 160, the IDNCD redirects the user to the process that was initiated in step 110 once the loading and/or scheduled delay is complete; in this embodiment, the user is redirected to the software application that was loaded to begin to utilize the application. In conjunction with the user initiating the loading process at step 110 and the background being displayed at step 120, a quantity of multimedia/advertisement content is disposed to load on the IDNCD at step 130 during a predetermined time period for the loading of the application. At step 140, a quantity of multimedia/advertisement content is displayed on the screen of the IDNCD. At step 150, the user is provided with an option to either select and/or flag the multimedia/advertisement content previously displayed on the IDNCD. Upon selection/flagging of the multimedia/advertisement content at step 170, then a record of the selected multimedia/advertisement is kept for later use by the user of IDNCD. Conversely, if the user of the IDNCD makes a decision not to select and/or flag any of the multimedia/advertisement content, then the user is ultimately redirected to the completed process which was previously initiated by the user at step 160.

Figure 2:
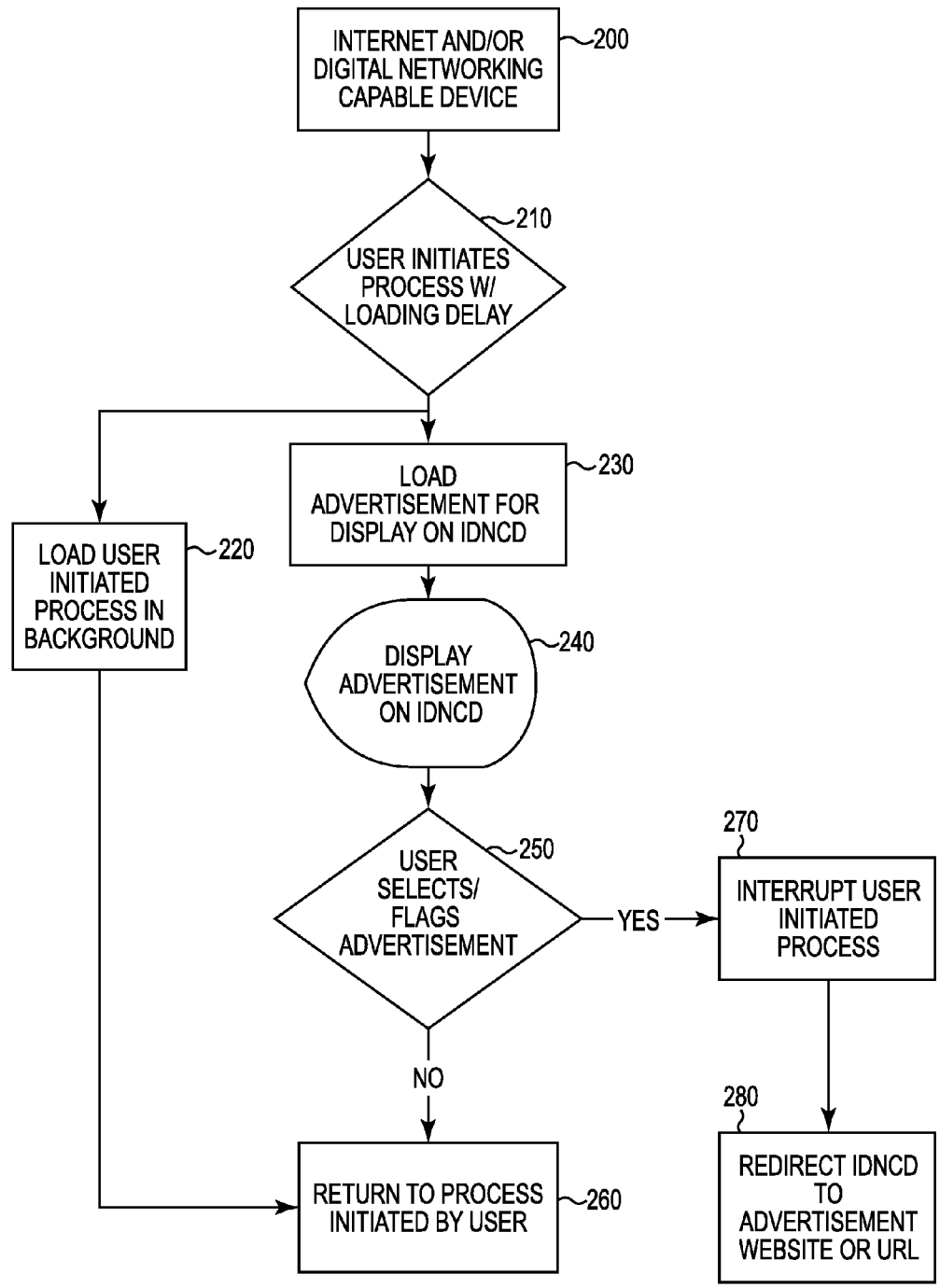
FIG. 2 is a block diagram illustrating a method for receiving multimedia/advertisement on an internet and/or digital networking capable device (IDNCD) wherein the content may be selected/flagged by a user initiated process and redirected.

FIG. 2 illustrates a block diagram of a method for receiving multimedia/advertisement on an internet and/or digital networking capable device ("IDNCD") wherein the content may be selected/flagged by a user initiated process and subsequently redirected. At step 200 an individual user of the system initiates the process by interacting with an IDNCD. At step 210, the user initiates a process on the IDNCD, wherein the process includes a loading or scheduled time delay; in one embodiment, the process may include starting a software application on the IDNCD. At step 220, a background or similar appearance is displayed on a screen of the IDNCD during the loading and/or scheduled delay upon initiation of the process in step 210. At step 260, the IDNCD redirects the user to the process that was initiated in step 210 once the loading and/or scheduled delay is complete; in this embodiment, the user is redirected to the software application that was loaded to begin to utilize the application. In conjunction with the user initiating the loading process at step 210 and the background being displayed at step 220, a quantity of multimedia/advertisement content is disposed to load on the IDNCD at step 230 during a predetermined time period for the loading of the application. At step 240, a quantity of multimedia/advertisement content is displayed on the screen of the IDNCD. At step 250, the user is provided with an option to either select and/or flag the multimedia/advertisement content previously displayed on the IDNCD. Upon selection/flagging of a quantity of multimedia/advertisement content by the user, then at step 270, there is an interruption in the user initiated process previously started at step 210. Following interruption of the initiated process, the user of the IDNCD is redirected to the website or URL of the selected advertisement/multimedia content at step 280. Conversely, if the user of the IDNCD makes a decision not to select and/or flag any of the multimedia/advertisement content, then the user is ultimately redirected to the completed process which was previously initiated by the user at step 260.

Figure 3:
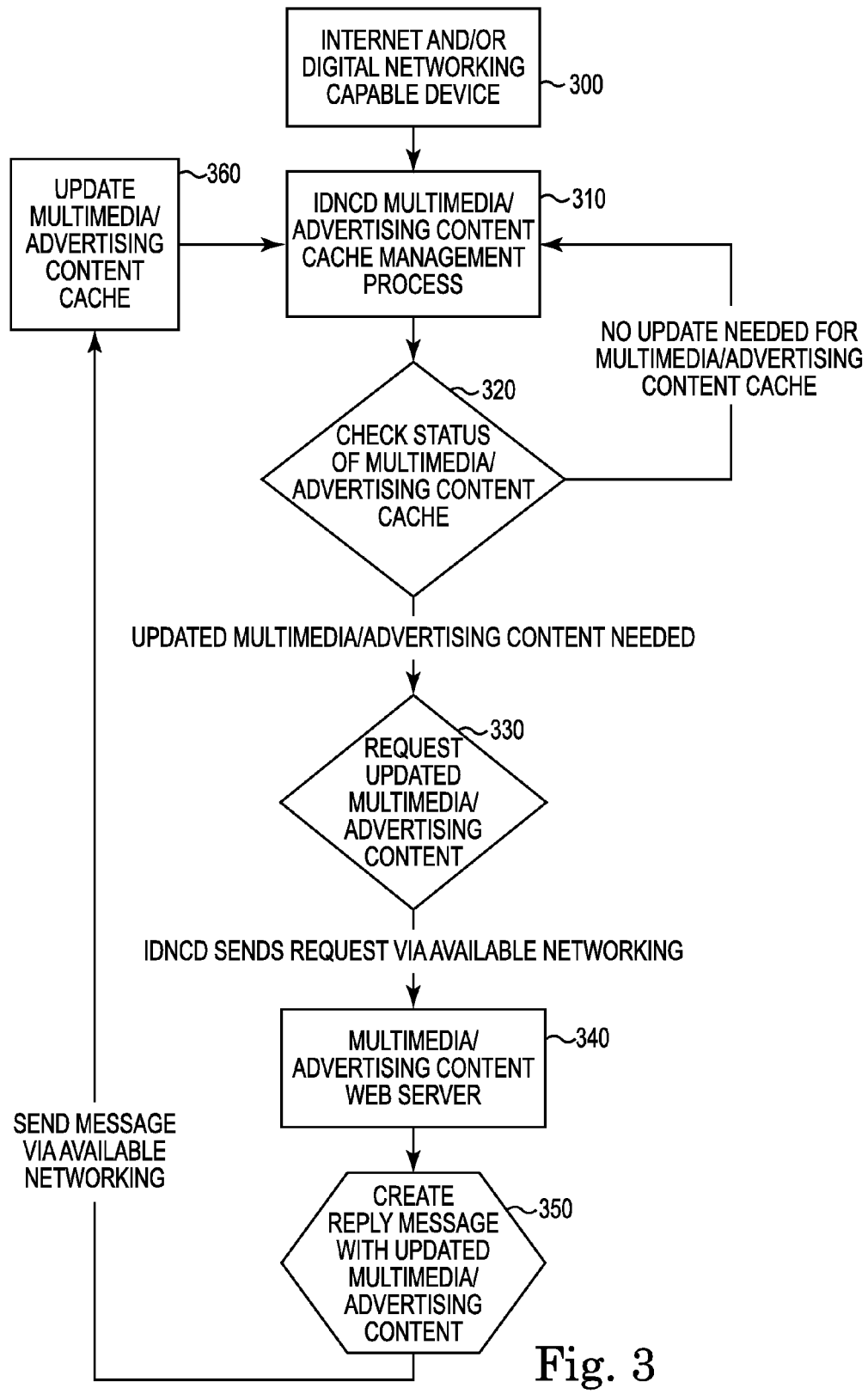
FIG. 3 is a block diagram illustrating a method for delivering multimedia/advertising content to an internet and/or digital networking capable device (IDNCD) wherein a system within the IDNCD or the device itself is disposed to manage a cache of multimedia/advertising content that is updated as necessary through a plurality of available digital networks.

FIG. 3 illustrates a block diagram of a method for delivering multimedia/advertising content to an internet and/or digital networking capable device ("IDNCD") wherein a system located within the IDNCD is disposed to manage a cache of multimedia/advertising content and wherein the system automatically updates the content as necessary through a plurality of available digital networks. At step 300 a user of the IDNCD may either initiate or conclude a multimedia/advertisement content display thereby prompting a cache management system at step 310 to initiate a process of determining whether it is necessary to provide an update to the multimedia/advertising content cache. At step 320, the management system checks the cache of the multimedia/advertisement content. If the event that the system determines that no new content is needed then the system cycles back to the start at step 310 and awaits for further initiation. Conversely, when the system determines that an update is necessary then a request is sent at step 330 through a plurality of available digital networks to a multimedia/advertising content server in step 340. At step 350, the server is disposed to create an update for the IDNCD device cache or an entirely new packet of multimedia/advertising content that is sent back to the device through a plurality of available digital networks. At step 360, the cache of the IDNCD is then updated with the updated or new digital multimedia/advertising content created in step 350 at which point the system cycles back to step 310 and awaits further requests.

Figure 4:
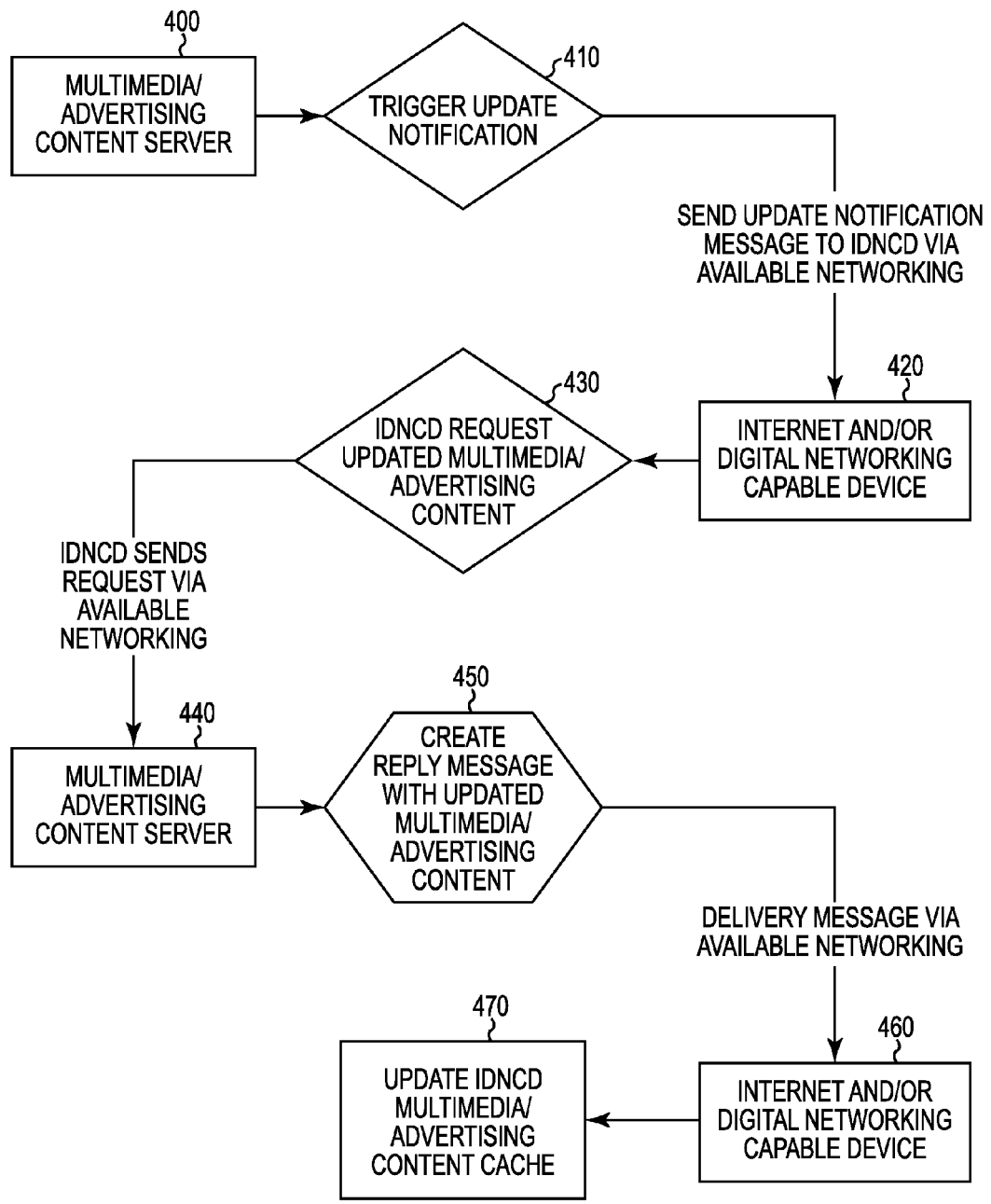
FIG. 4 is a block diagram illustrating a method for delivering multimedia/advertising content to an internet and/or digital networking capable device (IDNCD) wherein a multimedia/advertising content server is disposed to manage a cache of multimedia/advertising content on an IDNCD that is updated as necessary through a plurality of available digital networks.

FIG. 4 illustrates a block diagram of a method for delivering multimedia/advertising content to an internet and/or digital networking capable device ("IDNCD") wherein a multimedia/advertising content server is disposed to manage a cache of multimedia/advertising content on an IDNCD, wherein the cache is updated as required by the system through a plurality of available digital networks. At step 400, the server initiates a notification to be transmitted to the IDNCD. At step 410, the notification from the server is triggered, and subsequently transmitted through a plurality of available digital networks to the IDNCD in step 420. At step 430, the IDNCD or the user of the device responds to the notification initiated by the server and allows for the updates to be delivered to the IDNCD. At step 440, the notification is transmitted back from the IDNCD to the multimedia/advertising content server through a plurality of available digital networks. At step 450, the server is disposed to create an update for the IDNCD device cache or an entirely new packet of multimedia/advertising content that is transmitted to the device through a plurality of available digital networks. At step 460, once the content reaches the IDNCD, the cache of the IDNCD is then updated in step 470 with the updated or new digital multimedia/advertising content.

Figure 5:
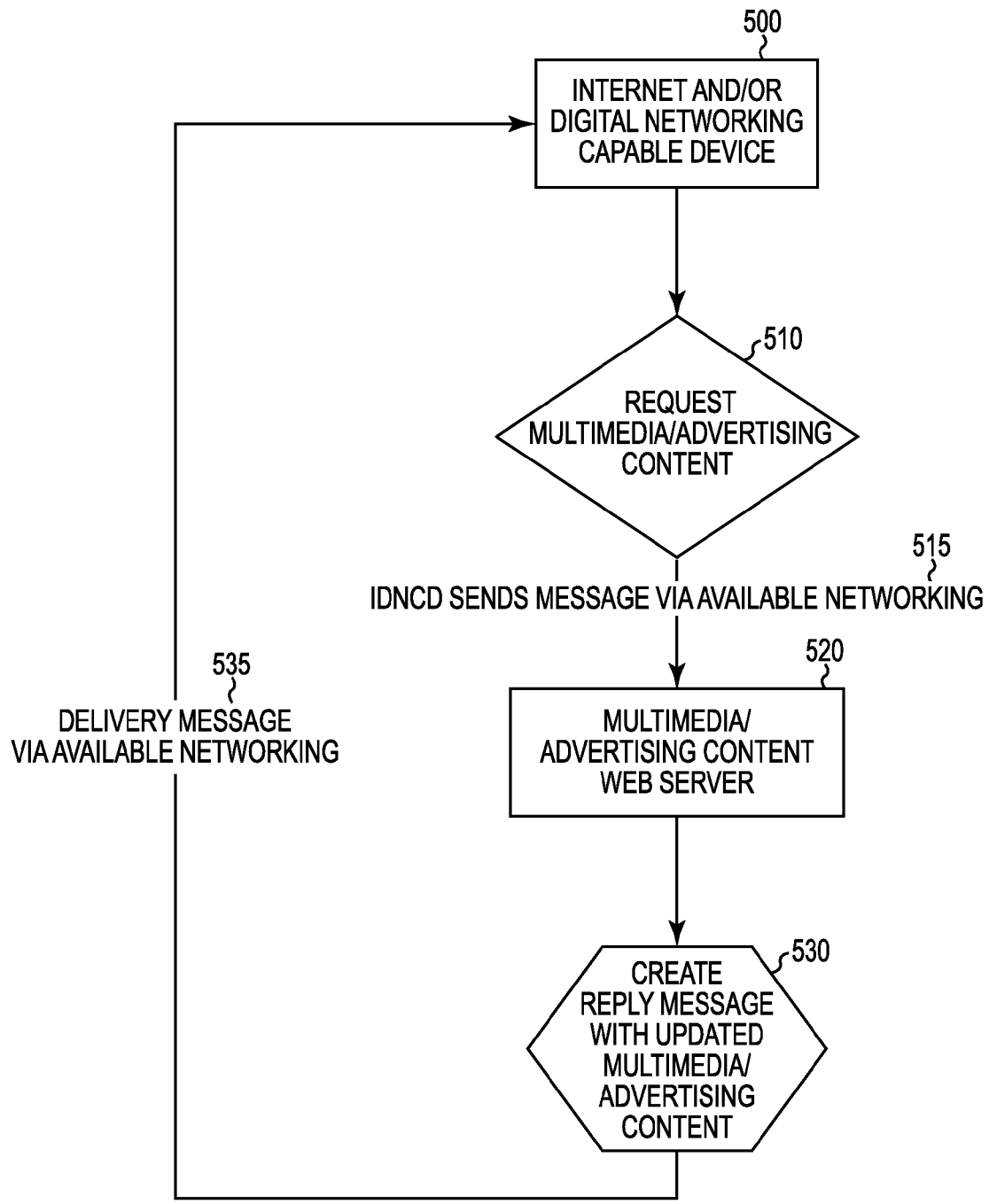
FIG. 5 is a block diagram illustrating a method for displaying multimedia/advertising content on an internet and/or digital networking capable device (IDNCD) wherein the content is retrieved by the device in real-time.

FIG. 5 illustrates a block diagram of a method for displaying multimedia/advertising content on an internet and/or digital networking capable device ("IDNCD") wherein the content is retrieved by the device in real-time. This embodiment is preferably utilized when the network/internet connection available to the IDNCD possesses very high speed and has very small latency, reducing the overall time for this process to complete. At step 500 a user of the IDNCD determines that content is need, and initiates a request for content at step 510. The content request from the IDNCD is in the form of a message sent through a plurality of available digital networks at step 515, wherein the message is received by a multimedia/advertising content server, at step 520. Upon receiving the message, the server creates a reply message containing all the data and content requested by the IDNCD at step 530. The replay message prepared at 530 is transmitted from the server to IDNCD at step 535, thereby completing the original request for content.

Figure 6:
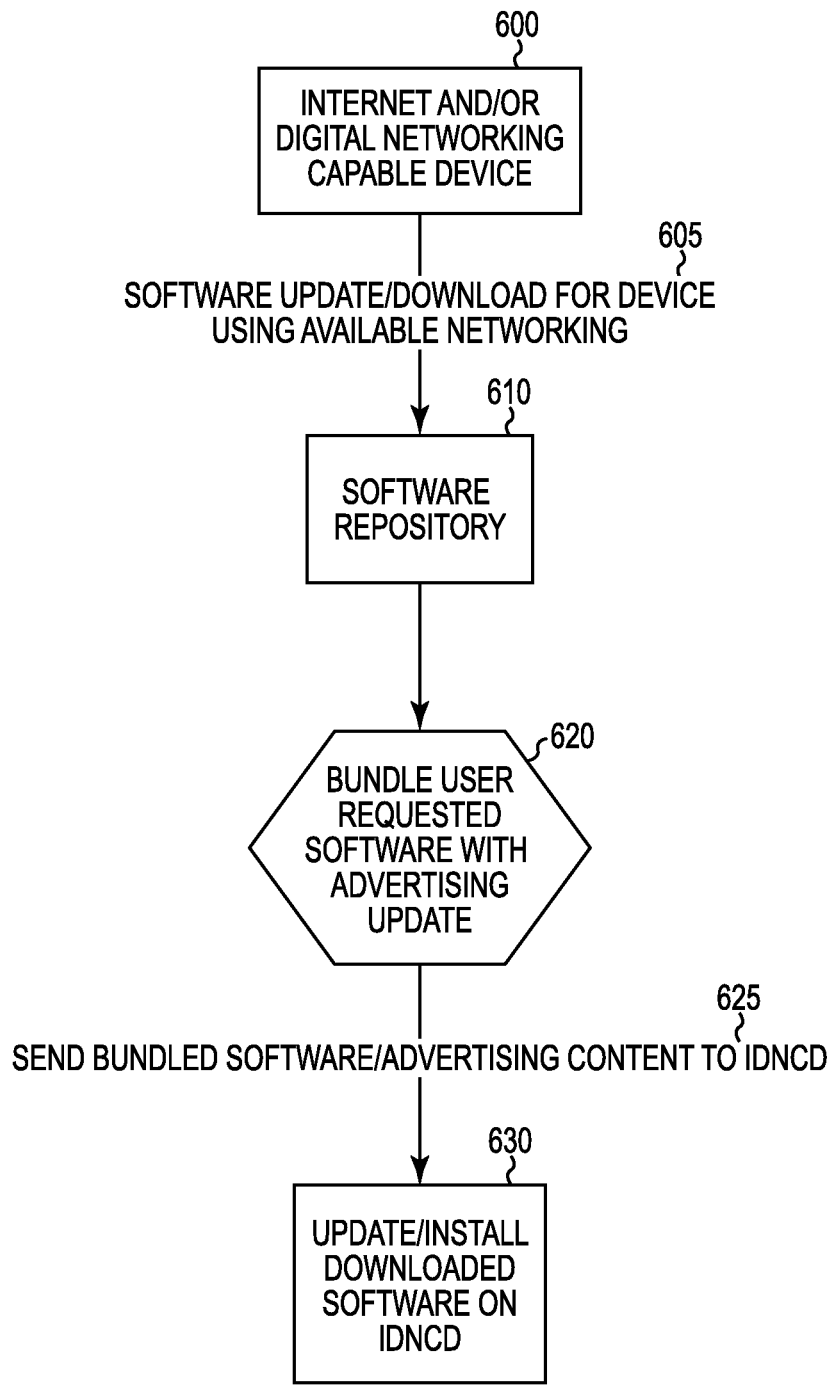
FIG. 6 is a block diagram illustrating a method for updating the cache of multimedia/advertising content on an internet and/or digital networking capable device (IDNCD) wherein the cache of advertising content is updated on the device in the event that additional software, programs, apps, firmware is downloaded or installed.

FIG. 6 illustrates a block diagram of a method for updating the cache of multimedia/advertising content on an internet and/or digital networking capable device ("IDNCD") wherein the cache of advertising content is updated on the device when additional software, programs, apps, firmware is either downloaded or installed. This embodiment may be utilized in conjunction with other methods of content delivery or when users are expected to download or update programs on their devices frequently. At step 600, a user of the IDNCD or the device itself, requests a software update/download from a software repository available through a plurality of available digital networks at step 605. At step 610, the software repository prepares the software or update request and bundles the software with updated multimedia/advertising content at step 620. The bundled software/multimedia content is transmitted to the device (or is made available to be downloaded directly from the device) through a plurality of available digital networks at step 625. The IDNCD then installs or updates the software from the bundle and updates the devices multimedia/advertising content cache with the update at step 630.

Figure 7:
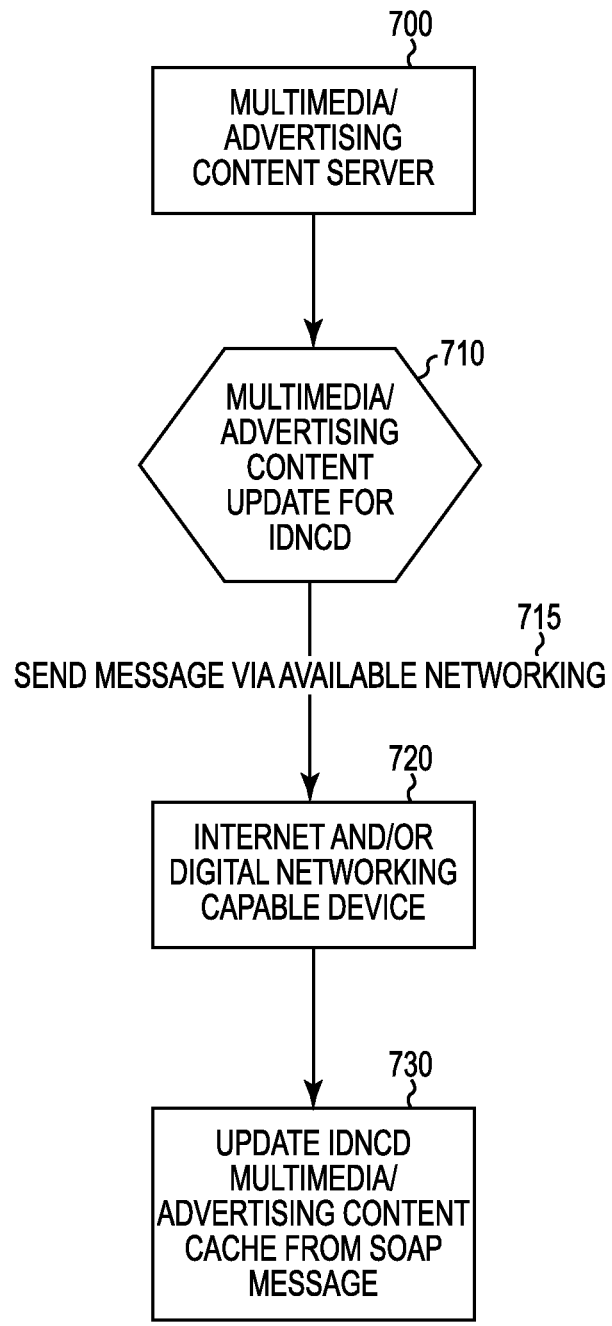
FIG. 7 is a block diagram illustrating a method for updating the cache of multimedia/advertising content on an internet and/or digital networking capable device wherein a server is disposed to transmit updated content directly to the device.

FIG. 7 illustrates a block diagram of a method for updating a cache of multimedia/advertising content on an internet and/or digital networking capable device ("IDNCD") wherein a server is disposed to transmit updated content directly to the device. At step 700, the server possesses a quantity of multimedia/advertising content. At step 710, the server prepares the updated content for the cache on the IDNCD. At step 715, the prepared content by the server is transmitted through a plurality of available digital networks to the IDNCD. In this embodiment, the message transmitted to the device may be the content itself, or the universal resource indicator of the content to allow the device to initiate the actual download. Once the IDNCD receives the updated content at step 720, the device uses the downloaded content to update the cache on the device, 730.

Figure 8:
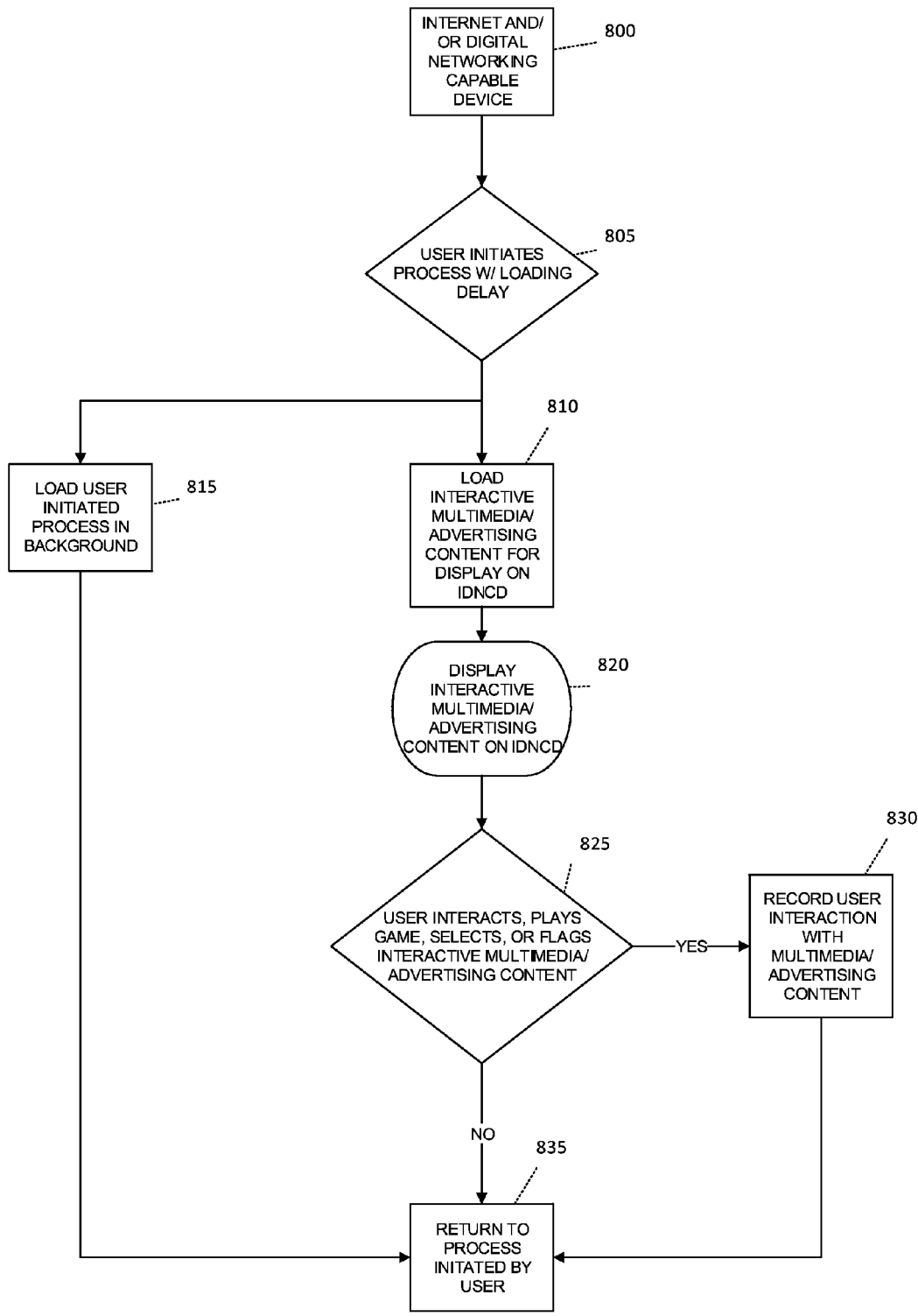
FIG. 8 is a block diagram illustrating a method for receiving multimedia/advertisement on an internet and/or digital wherein the displayed multimedia/advertisement is interactive and the interaction can be recorded.

FIG. 8 illustrates a block diagram of a preferred embodiment of the instant invention 10 for a system and method of advertising for use on internet and/or digital networking capable devices. In this embodiment, a method for receiving multimedia/advertisement on an internet and/or digital networking capable device ("IDNCD") is shown, wherein a user is provided with an option to interact with, select and/or flag multimedia/advertisement content being displayed, and record the user interaction. At step 800 an individual user of the system initiates the process by interacting with an IDNCD. At step 805, the user initiates a process on the IDNCD, wherein the process includes a loading or scheduled time delay; in one embodiment, the process may include starting a software application on the IDNCD. At step 815, a background or similar appearance is displayed on a screen of the IDNCD during the loading and/or scheduled delay upon initiation of the process in step 805. At step 835, the IDNCD redirects the user to the process that was initiated in step 805 once the loading and/or scheduled delay is complete; in this embodiment, the user is redirected to the software application that was loaded to begin to utilize the application. In conjunction with the user initiating the loading process at step 805 and the background being displayed at step 815, a quantity of multimedia/advertisement content is disposed to load on the IDNCD at step 810 during the loading of the application. At step 820, a quantity of multimedia/advertisement content is displayed on the screen of the IDNCD. At step 825, the user is provided with an option to interact with the multimedia/advertisement content previously displayed on the IDNCD. Multimedia or interactive advertising content can include audio, video, image, or haptic content displayed or presented from an internet or digital network capable device where the user can interact with the content via the available input methods provided with the device, including keyboard or mouse input, touch or swipe input, location tracking, a microphone, an accelerometer, a gyroscope, and the like. This interaction can include playing a game (e.g., maze, puzzle, drawing, etc.), taking a survey, selecting or providing input in response to displayed questions, or selecting and/or flagging the multimedia/advertisement content previously displayed. Upon interaction with, or selection/flagging of, the multimedia/advertisement content at step 825, then the interaction data or information can be recorded and kept for later use by the user of the IDNCD, or other users or server administrators, and the user is redirected at step 835 to the completed process initiated by the user. If the user of the IDNCD makes a decision not to select and/or flag any of the multimedia/advertisement content, then the user is ultimately redirected to the completed process which was previously initiated by the user at step 835.

The system and methods disclosed herein can include providing advertising for use on internet and/or digital networking capable devices via computer software, an internet website, a device application (or "app"), and the like. The multimedia or advertisement displayed can be interactive or non-interactive, and can be directed to services, promotions, or goods related to the software, website or app with which it is being displayed, or directed to unrelated third party services, promotions, or goods. The advertisements can be displayed in a limited display window or section, or as a full screen advertisement.

For certain embodiments, the multimedia or advertising can be displayed as partially transparent or translucent (e.g., ghosted) such that the user initiated process (such as the loading process) is at least partially visible to the user in the background (full screen or limited window display). Moreover, for various embodiments, the displayed multimedia or advertising can be displayed even after the loading process is complete, for a predetermined time, until the user selects or provides an input to remove the advertisement, or until the user makes an input selection to proceed to the completed process.

Further, the multimedia or advertising can be initiated simultaneously with the loading process or some time before or after the loading begins. Similarly, the multimedia or advertising can be stopped, e.g., cease displaying, before the loading process is complete, at the same time the loading process is complete, or a period of time after the loading process is complete.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method for displaying advertisement content on an internet capable device, comprising:
   displaying, by a web browser, advertisement content having a predetermined duration on a screen in a foreground operation on an internet capable device, in response to the web browser initiating a loading of user requested content in a background operation on the internet capable device;
   monitoring, by the web browser and in response to the displaying, the loading of the user requested content in the background operation;
   determining, by the web browser and based on the monitoring, that the loading of the user requested content has concluded in the background operation to define a user requested content stop event;
   ceasing, by the web browser, displaying in the foreground operation the advertisement content in response to the user requested content stop event, wherein the user requested content stop event occurs prior to or after an end of the predetermined duration on the screen of the internet capable device; and
   redirecting, by the web browser and in response to the ceasing, the user to the user requested content.

2. The method of claim 1, further comprising receiving input to stop the displaying of the advertisement content on the internet capable device.

3. The method of claim 1, wherein the displaying the advertisement content includes displaying at least one of a partially transparent version or a translucent version of the advertisement content.

4. The method of claim 1, further comprising displaying the advertisement content after the re-directing.

5. The method of claim 1, wherein at least one of a user selection, a user flagging or a user interaction with the advertisement content is recorded.

6. The method of claim 1, wherein the advertisement content is interactive.

7. The method of claim 1, wherein the advertisement content is interactive in the form of a game.

8. The method of claim 1, wherein the internet capable device is a mobile device and the user selected content is a webpage within an app.

9. The method of claim 1, further comprising determining that a quantity of the advertisement content is needed from a content server, in response to the web browser initiating the loading of the user requested content in the background operation.

10. The method of claim 1, wherein the web browser uses JavaScript.

11. The method of claim 1, further comprising determining that a quantity of the advertisement content is needed from a content server, in response to an insufficient cache of the advertisement content on the internet capable device.

12. The method of claim 1, further comprising determining that a quantity of the advertisement content is needed from a content server, in response to the web browser initiating the loading of the user requested content in the background operation.

13. The method of claim 1, wherein the advertisement content is obtained from a cache on the internet capable device.

14. The method of claim 1, further comprising receiving an update notification from a content server indicating that new advertisement content exists for updating a cache on the internet capable device.

15. The method of claim 1, further comprising receiving an update of a cache on the internet capable device with new advertisement content.

16. The method of claim 1, wherein the advertisement content is at least one of selected or flagged.

17. The method of claim 16, further comprising displaying on the screen in the foreground operation at least one of a quantity of the advertisement content or a delay.

18. An article of manufacture including a non-transitory, tangible computer readable storage medium having instructions stored thereon that, in response to execution by a web browser, cause the computer-based system to perform operations comprising:

displaying, by the web browser, advertisement content having a predetermined duration on a screen in a foreground operation on an internet capable device, in response to the web browser initiating a loading of user requested content in a background operation on the internet capable device;

monitoring, by the web browser and in response to the displaying, the loading of the user requested content in the background operation;

determining, by the web browser and based on the monitoring, that the loading of the user requested content has concluded in the background operation to define a user requested content stop event;

ceasing, by the web browser, displaying in the foreground operation the advertisement content in response to the user requested content stop event, wherein the user requested content stop event occurs prior to or after an end of the predetermined duration on the screen of the internet capable device; and redirecting, by the web browser and in response to the ceasing, the user to the user requested content.

19. A system comprising:

a processor in communication with a web browser, a tangible, non-transitory memory configured to communicate with the processor, the tangible, non-transitory memory having instructions stored thereon that, in response to execution by the processor, cause the processor to perform operations comprising:

displaying, by the web browser, advertisement content having a predetermined duration on a screen in a foreground operation on an internet capable device, in response to the web browser initiating a loading of user requested content in a background operation on the internet capable device;

monitoring, by the web browser and in response to the displaying, the loading of the user requested content in the background operation;

determining, by the web browser and based on the monitoring, that the loading of the user requested content has concluded in the background operation to define a user requested content stop event;

ceasing, by the web browser, displaying in the foreground operation the advertisement content in response to the user requested content stop event, wherein the user requested content stop event occurs prior to or after an end of the predetermined duration on the screen of the internet capable device; and redirecting, by the web browser and in response to the ceasing, the user to the user requested content.

* * * * *